Feb. 27, 1968     P. J. WYNNE     3,371,143
VALVE CONTROL FOR VACUUM FURNACES
Filed Aug. 26, 1965
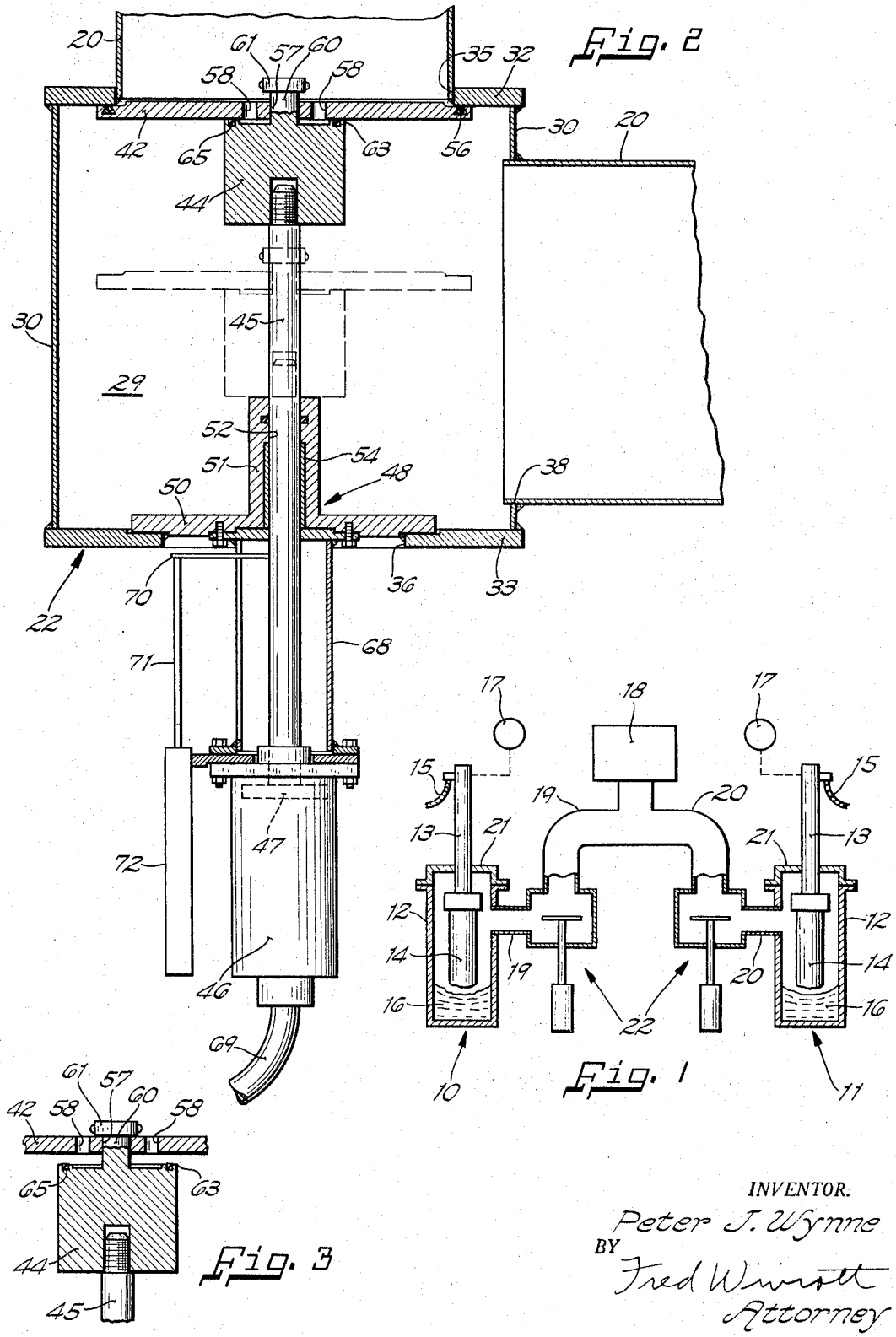
INVENTOR.
Peter J. Wynne
BY
Fred Wiwiott
Attorney

United States Patent Office 3,371,143
Patented Feb. 27, 1968

3,371,143
VALVE CONTROL FOR VACUUM FURNACES
Peter J. Wynne, Pittsburgh, Pa., assignor to McGraw-Edison Company, Milwaukee, Wis., a corporation of Delaware
Filed Aug. 26, 1965, Ser. No. 482,664
8 Claims. (Cl. 13—31)

ABSTRACT OF THE DISCLOSURE

A value control for connection in a conduit between a vacuum furnace and a source of vacuum, including first and second valve means operated together for closing the conduit and operated independently for opening the conduit whereby the second valve means has a restricted flow passageway and is opened initially to permit pressures on opposite sides of the first valve means to become balanced gradually and thereafter the first valve means is opened.

---

This invention relates to consumable electrode vacuum arc furnaces and, more particularly, to the vacuum system for such furnaces.

Consumable electrode arc furnaces have been widely used for such applications as the melting of refractory metals of which titanium is an example. Such furnaces, in general, include a sealed chamber wherein a consumable electrode is progressively melted under a vacuum and the resulting molten metal collected in a crucible to form an ingot. Melting is accomplished by means of an arc which is drawn between the consumable electrode and the ingot and which is sustained by relatively large direct currents. As the ingot forms, the electrode must be gradually lowered in order to maintain the arc length necessary for the desired melting conditions.

The furnace chamber of vacuum arc consumable electrode furnaces is generally connected through a valve to suitable vacuum apparatus such as a diffusion pump. In prior art systems, it was necessary to shut down the pumping apparatus before the valve leading to the furnace chamber was opened or else the air in the furnace chamber would rush back into the vacuum system and swamp the diffusion pumps so that they ceased to operate. Shutting down the vacuum system greatly prolonged the furnace evacuating operation and further prevented the maintenance of a vacuum in a plurality of furnace chambers by means of a single vacuum system.

It is an object of the invention to provide a vacuum arc furnace and means for connecting vacuum apparatus to the furnace chamber without returning the vacuum system to atmospheric pressure.

A further object of the invention is to provide a plurality of vacuum arc furnaces and means for simultaneously coupling each to a vacuum system wherein each furnace may be individually pressurized without affecting the vacuum in the remaining furnaces.

These and other objects and advantages of the instant invention will become more apparent from the detailed description thereof taken with the accompanying drawings, in which:

FIG. 1 schematically illustrates the vacuum system according to the instant invention as applied to a plurality of consumable electrode arc furnace chambers;

FIG. 2 is a side elevational view, partly in section, of the valve portion of the vacuum system illustrated in FIG. 1; and FIG. 3 is a fragmentary view showing a portion of the valve of FIG. 2 in an alternate position.

Referring now to the drawing in greater detail, FIG. 1 shows a pair of consumable electrode vacuum arc furnaces 10 and 11, each of which includes a sealed furnace chamber 12 and an electrode ram assembly 13 for supporting an electrode 14 within the furnace chamber 12. A conductor 15 suitably connects the electrode ram 13 to a source of electrical energy so that an arc may be struck at the lower end of the electrode 14 to provide the necessary heat of fusion for the melting operation. As the electrode 14 melts the molten metal collects in the lower end of the furnace chamber 12 to form an ingot 16. As the melting operation continues, the electrode 14 is lowered toward the ingot 16 by means of the electrode drive mechanism 17 to maintain the proper arc length by means of the electrode drive mechanism 17. A suitable vacuum pump 18 is connected to each of the furnaces 10 and 11 by conduits 19 and 20, respectively.

The details of the consumable electrode vacuum arc furnaces 10 and 11 form no part of the instant invention, and accordingly they have been schematically illustrated for the sake of brevity. For a more complete description of a consumable electrode vacuum arc furnace of this type, reference is made to copending application Ser. No. 374,992 filed June 15, 1964 and assigned to the assignee of the instant invention.

At the completion of a furnace operation, the electrode 14 is substantially consumed and the ingot 16 must then be removed from the furnace chamber 12. In addition, a new electrode 14 must be mounted on the lower end of the electrode ram 13 so that a subsequent furnace melting operation can be performed. It is, therefore, necessary to vent the furnace chamber 12 to the atmosphere and then to remove the furnace cover 21. For this reason, identical valves 22 are disposed in conduits 19 and 20 and between the vacuum pump 18 and each of the furnace chambers 12.

Each of the valves 22 includes a valve chamber 29 formed by a generally cylindrical, open-ended, hollow, metallic member 30 which is closed by a generally circular cover plate 32 attached to its upper end and a generally circular bottom plate 33 affixed to the lower end thereof. A central aperture 35 is formed in the cover plate 32 for receiving the lower end of the vacuum pump portion of the conduit 20. In addition, the bottom plate 33 also has a circular central aperture 36 through which the operating portion of the valve 22 extends. The furnace portion of the conduit 20 communicates with the interior of the valve chamber 29 through an opening 38 in the side of the member 30.

In general, valve 22 includes a generally circular valve plate 42 carried by a valve block 44 which, in turn, is mounted at the upper end of a piston stem 45 extending upwardly from a piston 47 disposed in an air cylinder 46. The valve 22 is mounted in the chamber 29 by a support member 48 which has a generally circular base portion 50 secured to the bottom plate 33 and sealing the aperture 36. In addition, the support member 48 includes a generally cylindrical sleeve portion 51 extending upwardly from the base portion 50 and having a central bore 52 which receives the piston stem 45. A suitable bearing sleeve 54 is disposed in a recessed portion of the bore 52 to facilitate the passage of the piston stem 45.

The valve plate 42 has a suitable gasket 56 adjacent the outer periphery of its upper surface and which cooperates with the lower surface of the cover plate 32 which acts as a valve seat to seal the opening 35 when the valve plate 42 is in its closed position shown by full lines in FIG. 2. In addition, the valve plate 42 has a small central aperture 57 and a plurality of small ports 58 disposed in circular array around the central aperture 57.

The valve block 44 is generally circular and has an upwardly extending central stem 60 which passes loosely through the central aperture 57 in the valve plate 42 and which carries a retaining collar 61 at its upper end. The length of the stem 60 is sufficiently greater than the thickness of the valve plate 42 so that when the valve block is in its position shown by full lines in FIG. 2, the collar 61 is disposed a short distance above the valve plate 42. As a result, a small amount of relative movement between the valve block 44 and the valve plate 42 is permitted by the stem 60 and the collar 61.

The valve block 44 also has an upwardly extending annular rim 63 formed about the outer periphery of its upper surface and disposed outwardly of the ports 58 in the valve plate 42. In addition, the rim 63 carries a gasket 65 which cooperates with the lower surface of the valve plate 42 to seal the ports 58 and the gap between the aperture 57 and the stem 60 when the valve block 44 is in its position shown by full lines in FIG. 2.

The air cylinder 46 is supported below the chamber 29 by a bracket member 68 and is connected to a pressure source by a conduit 69.

During furnace melting operations, the air cylinders 46 of each of the valves 22 are depressurized so that the valve plate 42 is in its phantom position shown in FIG. 2 whereby the interiors of each of the furnace chambers 12 are connected to the vacuum pump 18. Assume for purposes of illustration, that the electrode 14 in the furnace 11 has been consumed and it is desired to remove the ingot 16 in preparation for a subsequent melting operation. The air cylinder 46 of the valve 22, which connects the furnace 11 to the vacuum pump 18, is then pressurized so that its valve plate 42 and the valve block 44 are moved upwardly from their positions shown by phantom lines in FIG. 2 to their positions shown by full lines. This isolates the furnace 11 from the vacuum pump 18. The vacuum pump 18 remains connected to the furnace 10, however, so that the latter remains evacuated.

The furnace 11 is then vented to the atmosphere, its cover 21 removed, and the lower end of the electrode ram 13 withdrawn. After the ingot 16 has been removed from the furnace 11, a new electrode 14 is then lowered into position and the cover 21 replaced whereupon the furnace 11 is in condition for a melting operation. Where it is now necessary to stop the vacuum pump 18 before opening the valve 22 connecting the furnace 11 to the pump 18, it would also be necessary to suspend the melting operation in the furnace 10. As will now be explained, the valve 22 allows the furnace 11 to be connected to the pump 18 without a loss of pressure in the system.

When it is desired to reconnect the furnace 11 to the vacuum pump 18 preparatory to a furnace melting operation, the pressure within the air cylinder 46 is reduced so that the valve block 44 is permitted to move downwardly until the collar 61 strikes the valve plate 42 as shown in FIG. 3. The valve plate 42 remains against the under surface of the cover plate 32 as a result of the much higher pressure in the furnace 11 than in the vacuum pump portion of the conduit 20.

The downward movement of the valve block 44 opens the small ports 58 in the valve plate 42 so that the valve chamber 29 is connected to the vacuum pump 18 through this restricted passage. This allows the air within the furnace 11 to be evacuated slowly through the ports 58 without swamping the vacuum pump 18.

As the air pressure on the opposite sides of the valve plate 42 equalizes, said plate will fall from its closed position shown by full lines in FIG. 2 to its fully opened position shown by phantom lines.

It will be appreciated that if the furnace chamber 11 were directly connected to the vacuum system 18 at the commencement of an evacuating process, it would first be necessary to stop the pump 18 or else the latter would become swamped and cease to operate. This would necessitate that the furnace 10 also be shut down because its pressure would rise above the tolerable limits when pump 18 was not operating. However, the vacuum assembly according to the instant invention allows the furnace 11 to be evacuated while the pump 18 continues to operate and maintains the furnace 10 in a suitably evacuating condition.

In order to prevent rotation of the piston 47, the valve block 44 and the valve plate 42, a guide arm 70 is affixed to the piston stem 45 and extends laterally therefrom and carries a downwardly extending guide pin 71 at its outer end for telescoping movement within a guide sleeve 72 extending downwardly from the lower end of the bracket member 68.

While only a single embodiment of the invention is shown and described, it is not intended to be limited thereby but only by the scope of the appended claims.

I claim:

1. In a vacuum furnace having a chamber communicating with the melt, a vacuum source, and a conduit between the chamber and vacuum source suitable for communicating them together to evacuate the chamber, an improved valve control located in series connection with the conduit between the chamber and source, comprising a first valve means having a first passageway of low flow resistance, a second valve means having a second passageway of much higher resistance to flow than the first passageway, means connected to the second valve means operable to close said second valve means and block said second passageway, and means including a movable connection between the first and second valve means operable in one sense and when the second valve means is closed to close the first valve means for blocking said first passageway and consequently said conduit and operable in the opposite sense to open said second valve means while said first valve means is yet closed to accommodate limited highly restricted flow through the conduit via the second passageway only.

2. A valve control according to claim 1, wherein the first valve means includes a first valve member that moves in the direction relative to the conduit from the vacuum source toward the chamber when said first valve means is moved from its closed position to its opened position.

3. A valve control according to claim 2, wherein the second valve means includes a second valve member that moves in the direction relative to the conduit from the vacuum source toward the chamber when said second valve means is moved from its closed position to its opened position.

4. A valve control according to claim 1, wherein the first valve means includes a valve seat and a first valve member adapted to be moved into seating relationship with said valve seat to close the first passageway, and wherein the second valve means is located on said first valve member.

5. The combination of, a plurality of electric vacuum arc furnaces each having a sealed furnace chamber, a vacuum source adapted to be connected by conduits to the respective chambers, a plurality of pressure responsive first valve means, one of said first valve means being disposed in series connection with each conduit between said vacuum source and the respective furnace chamber, second valve means associated with said first valve means and having a restricted passageway as compared to the first valve means, each second valve means being located in parallel connection across the respective first valve means between its furnace chamber and said vacuum source, respective operating means to close and to open each of said first valve means as desired and respective operating means to close and to open each of said second valve means as desired, said operating means being interrelated to the extent that the first and second valve means are closed together in order to isolate each furnace chamber from the vacuum source but being independent to the extent that each second valve means is opened before and independently of its associated first valve means to provide only a restricted communication between the vacuum source and the respective furnace chamber, and said operating means for the first valve means holding said first valve means closed unitil the pressure in the furnace chamber approximates the pressure of said vacuum source.

6. The combination of, an electric vacuum arc furnace having a sealed furnace chamber, a vacuum source adapted to be connected by a conduit to the chamber, a first valve means, said first valve means being disposed in series connection with the conduit between said vacuum source and the furnace chamber, second valve means located in parallel across said first valve means and having a restricted passageway as compared to the first valve means, operating means to close and to open said first valve means as desired and operating means to close and to open said second valve means as desired, said operating means being interrelated to the extent that the first and second valve means are closed together in order to isolate the furnace chamber from the vacuum source but being independent to the extent that the second valve means is opened before and independently of the first valve means to provide only a restricted communication between the vacuum source and the furnace chamber, and said operating means for the first valve means holding said first valve means closed until the pressure in the furnace chamber approximates the pressure of said vacuum source.

7. In a vacuum furnace having a chamber communicating with the melt, a vacuum source, and a conduit between the chamber and vacuum source suitable for communicating them together to evacuate the chamber, an improved valve control located in series connection with the conduit between the chamber and source, comprising a first valve means having a first passageway of low flow resistance, a second valve means having a second passageway of much higher resistance to flow than the first passageway and connected across the first valve means, means connected to the second valve means operable to close said second valve means for blocking said second passageway and means connected to the first valve means operable to close the first valve means for blocking said first passageway and thereby blocking said conduit when the first and second valve means are both closed, said means connected to the second valve means also being operable to open said second valve means while said first valve means is yet closed to accommodate limited highly restricted flow through the conduit via the second passageway only and thereafter said means connected to the first valve means also being operable to open the first valve means.

8. A valve control according to claim 7, wherein said means connected to the first valve means opens the first valve means only after the pressures on opposite sides of the valve means are approximately equal.

References Cited

UNITED STATES PATENTS 2,789,150   4/1957   Clough et al. _____ 13—31 XR

ROBERT K. SCHAEFER, *Primary Examiner.*

M. GINSBURG, *Assistant Examiner.*